United States Patent [19]

Lee

[11] Patent Number: 5,301,333
[45] Date of Patent: Apr. 5, 1994

[54] TREE STRUCTURED VARIABLE PRIORITY ARBITRATION IMPLEMENTING A ROUND-ROBIN SCHEDULING POLICY

[75] Inventor: Kuo-Chu Lee, Franklin, N.J.

[73] Assignee: Bell Communications Research, Inc., Livingston, N.J.

[21] Appl. No.: 113,588

[22] Filed: Aug. 27, 1993

Related U.S. Application Data

[63] Continuation of Ser. No. 537,683, Jun. 14, 1990, abandoned.

[51] Int. Cl.[5] ............ G06F 13/37; H04Q 11/00
[52] U.S. Cl. .................. 395/725; 395/325; 364/242.6; 364/242.8; 364/242.9; 364/DIG. 1; 364/937.01; 364/940.92; 364/940.8; 364/DIG. 2; 340/825.5; 370/54; 370/63
[58] Field of Search ............ 395/725, 325; 370/54, 370/63

[56] References Cited

U.S. PATENT DOCUMENTS

| | | | |
|---|---|---|---|
| 3,353,160 | 6/1967 | Lindquist | 364/200 |
| 4,314,335 | 2/1982 | Pezzi | 364/200 |
| 4,347,498 | 8/1982 | Lee et al. | 395/325 |
| 4,621,342 | 11/1986 | Capizzi et al. | 364/900 |
| 4,672,536 | 6/1987 | Giroir et al. | 395/725 |
| 4,924,380 | 5/1990 | McKinney et al. | 395/325 |
| 4,953,081 | 8/1990 | Feal et al. | 364/200 |
| 4,980,854 | 12/1990 | Donaldson et al. | 395/325 |
| 5,025,370 | 6/1991 | Koegel et al. | 364/200 |
| 5,053,942 | 10/1991 | Srini | 395/325 |
| 5,060,139 | 10/1991 | Theus | 395/435 |
| 5,072,363 | 12/1991 | Gallagher | 395/325 |
| 5,088,024 | 2/1992 | Vernon et al. | 395/725 |

OTHER PUBLICATIONS

"The Design of Nectar:A Network Backplane for Heterogeneous Multicomputers", E. A. Arnould et al., ASPLOS-III Proc. 3rd Int'l Conf. on Archit. Support for Prog. Lang. and Oper. Systems, pp. 205-216, Boston, MA, Apr. 3-6, 1989.
"An O((log N)$^2$) Control Algorithm", T-Y Feng et al., Proc. of Conf. on Parllel Processing, pp. 334-340, 1985.
"A Self-Routing Benes Network and Parallel Permutation Algorithms", D. Nassimi et al, IEEE Transaction on Computers, vol. C-30, No. 5, pp. 332-340, May 1981.
"Performance Measurements on a 128-Node Butterfly Parallel Processor", W. Crowther et al., Proc. 1985 Int. Conf. Parallel Processing, pp. 531-540, Aug. 1985.
"The IBM Research Parallel Processor (Prototype (RP3):Introduction and Architecture", G. F. Pfister et al., Proc. of Int'l Conf. on Parallel Processing, pp. 764-771, 1985.
"How to Emulate Shared Memory", A. G. Ranade, IEEE Symposium on Foundation of Computer Science, pp. 185-194, 1987.
"Non-Von's Performance on Certain Data base Benchmarks", B. K. Hillyer et al., IEEE Transactions on Software Engineering, vol. 12, No. 4, pp. 577-583, Apr. 1986.
"Multicomputers: Message-Passing Concurrent Computers", W. C. Athas et al, IEEE Computer, pp. 9-24, Aug. 1988.
"Multi-Level Shared Caching Techniques for Scalability in VMP-MC", D. R. Cheriton et al., ACM Symposium on Computer Architecture, pp. 16-24, 1989.
"GAMMA-A High Performance Dataflow Database Machine", D. DeWaitt et al., Proc. of the VLDB Conf. Japan, pp. 228-237, Aug. 1986.

(List continued on next page.)

Primary Examiner—Robert B. Harrell
Assistant Examiner—Timothy L. Philipp
Attorney, Agent, or Firm—Leonard C. Suchyta; Loria B. Yeadon

[57] ABSTRACT

An inventive arbiter controls access to a resource in a high speed computer or telecommunications network. The arbiter is capable of performing round-robin scheduling for N requests with P possible priority levels with a sublinear time complexity. The high arbitration speed is achieved through use of a tree structure with a token distribution system for implementing the round-robin scheduling policy.

13 Claims, 3 Drawing Sheets

OTHER PUBLICATIONS

"The Wisconsin Multicube: A New Larger-Scale Cache Coherent Multiprocessor", J. Goodman et al., IEEE International Symposium on Computer Architecture Conference, pp. 422-432, 1988.

"The Knockout Switch": A Simple Modular Architecture for High-Performance Packet Switching, Y.S. Yeh et al., IEEE Journal on Selected Areas in Comm., vol. SAC-5, No. 8, pp. 1274-1282, Oct. 1987.

"A Survey of Interconnection Networks", T-Y Feng, Computer, pp. 5-20, Dec. 1981.

DBC/1012 Data Base Computer "Concepts and Facilities", CO2-0001-05 Release 3.1, pp.2-1-2-

"Parallel Processing the Cm* Experience", E. Gehringer et al, Digital Press, pp. 11-13, 1987.

"Applications of Self-Routing Switches to LATA Fiber Optic Networks", C. Day et al., Int'l Switching Symposium, Phoenix Arizona, Mar. 1987.

"Starlite: A Wideband Digital Switch", A. Huang et al., Proc. of Globecom '84, pp. 121-125.

"Distributed Round-Robin and First-Come, First-Serve Protocols and Their Application to Multiprocessor Bus Arbitration", M. K. Vernon et al, The ACM 15th Ann. Int'l. Symp. on Computer Arch., 1988.

"Arbitration and Control Acquisition in the Proposed IEEE 896 Futurebus", D. M. Taub, IEEE Micro, vol. 4, No. 4, pp. 28-41, Aug. 1984.

"A Fully Distributed Arbiter for Multi-processor Systems", G. Cioffi et al, Microprocessor and Microprogramming, vol. 11, pp. 15-22, 1983.

"High-Speed Bus Arbiter for Multiprocessors", A. B. Kovaleski, IEE Proc. vol. 130, Pr, E, No. 2, pp. 49-56, Mar. 1983.

"A Variable Priority Arbiter for Resource Allocation in Asynchronous Multiprocessor Systems", Bogdan Lent, Microprocessing and Microprogramming, vol. 9, pp. 299-307, 1982.

"Arbiter Designs for Multiprocessor Interconnection Networks", Joseph K. Muppala et al, Microprocessing and Microprogramming, vol. 26, pp. 31-43, 1989.

TREE STRUCTURED VARIABLE PRIORITY ARBITRATION IMPLEMENTING A ROUND-ROBIN SCHEDULING POLICY

This is a continuation of application Ser. No. 07/537,683 filed Jun. 14, 1990, now abandoned.

RELATED APPLICATION

An application entitled "Packet Parallel Interconnection Network" filed for K. C. Lee on even date herewith, bearing, U.S. Pat. No. 5,191,578, issued Mar. 2, 1993, and assigned to the assignee hereof contains subject matter related to the subject matter of the present application. The contents of the related application are incorporated herein by reference.

FIELD OF THE INVENTION

The present invention relates to an arbiter and an arbitration process for controlling access to particular resources in a high speed computer or telecommunications network. More particularly, the present invention relates to a high speed variable priority round-robin arbiter with a sublinear time complexity, i.e., an arbiter for which the time duration of an arbitration cycle increases with the log of the number N of inputs rather than linearly with the number of inputs.

BACKGROUND OF THE INVENTION

Resource arbitration is a fundamental problem in computer and telecommunications network design. An arbiter controls the access of a plurality of competing inputs to a desired resource such as a bus or multiplexer in a computer or telecommunications network.

In particular, high speed arbitration among inputs with variable priorities is needed to support variable priority communications in a dynamic multi-tasking environment and to accommodate the increasing speed of highly pipelined data parallel buses and high speed statistical multiplexers. Preferably, the arbiter carries out a round-robin scheduling process to insure that all inputs of equal priority achieve fair access to the resource being arbitrated.

A variety of arbiters have been disclosed in the prior art. However, as is discussed below, only a few of the prior art arbiters support variable priority arbitration. One prior art arbiter is disclosed in Bogdan Lent, "A Variable Arbiter for Resource Allocation in Asynchronous Multiprocessor Systems," Microprocessing and Microprogramming, Vol. 9, 1982. This arbiter is based on a priority comparison matrix and can support variable priority arbitration or a first-come, first-served scheduling policy. However, this arbiter does not support round-robin scheduling on variable priority classes and, in addition, it has a space complexity of order $N^2$, where N is the number of inputs. Thus, this arbiter increases in size too rapidly with large N.

An arbiter with a round-robin scheduling policy and with a policy for handling urgent requests is disclosed in Mary K. Vernon et al, "Distributed Round-Robin and First-come, First-serve Protocols and Their Application to Multiprocessor Bus Arbitration," The ACM 15th Annual International Symposium on Computer Architecture, 1988 and in D. M. Taub, "Arbitration and Control Acquisition Scheme for the IEEE 896 Futurebus," IEEE Micro, Vol. 4, No. 4, August 1984, pp. 28–41. However, these arbiters do not support round-robin arbitration for multiple priority classes.

To match the speed of highly pipelined buses and multiplexers, an arbiter with a round-robin scheduling policy and with a sublinear time complexity is desired. The linear array based round-robin arbiters proposed in Joseph K. Muppala et al, "Arbiter Designs for Multiprocessor Interconnection Networks," Microprocessing and Microprogramming, Vol. 26, 1989 and in G. Cioffi et al, "A Fully Distributed Arbiter for Multiprocessor Systems," Microprocessor and Microprogramming, Vol. 11, pp. 15–22, 1983, have O(N) time complexity. Since the arbitration time of these arbiters increases linearly with the number of input ports, they cannot match the data transfer rate in a highly pipelined communications system where N is large.

In the case of highly parallel and pipelined bus systems, arbitration needs to be performed in each system clock cycle. Arbitration schemes that utilize a table lookup method to implement rotating priority arbitration (see. e.g., A. B. Kovaleski, "High-Speed Bus Arbiter for Multiprocessor," IEE Proc. Vol. 130, Pr, E, No. 2, March 1983 and the Vernon et al reference identified above) can reach higher speeds but their space complexity will increase exponentially with the number of inputs and the number of priority classes.

Distributed arbiters (see, e.g., the Taub, Cioffi et al, and Vernon et al references identified above) have the advantage of modularity. However, their arbitration time is relatively long compared to that of a centralized arbiter. In order to support P priority levels and N input nodes, the arbitration process needs to step through $\log^P$ priority bus lines and $\log^N$ node identification bus lines to reach a distributed arbitration decision. Although the distributed arbitration scheme only requires on the order of ($\log^P+\log^N$) time steps, each step requires a long delay due to off-chip communications, bus propagation, wire or glitch elimination, and capacitive loads of bus drivers.

Briefly stated, none of the above-identified prior art arbiters is entirely satisfactory for use in high speed computer and telecommunications networks because they are incapable of handling multiple priority classes, because they do not utilize a round-robin scheduling policy, because the time or space complexity is too great, or because centralized arbitration is not utilized.

In view of the foregoing, it is an object of the present invention to provide an arbiter and associated arbitration process which overcomes the shortcomings of the above-described prior art arbiters. It is a further object of the invention to provide an arbiter and associated arbitration process suitable for use in high speed computer and communications systems.

More particularly, it is an object of the invention to provide an arbiter and associated arbitration process whose arbitration speed increases sublinearly as the number N of inputs increases. It is also an object of the invention to provide an arbiter and associated arbitration process which implements a round-robin scheduling policy, which is capable of handling multiple priority classes and which is centralized.

SUMMARY OF THE INVENTION

The present invention is a centralized variable priority arbiter based on a tree structure. The tree-structured arbiter takes N contending requests belonging to P priority classes and utilizes an arbitration process to select only one of the contenders as a winner.

More particularly, the inventive arbiter comprises a plurality of leaf and non-leaf nodes arranged in a tree structure. Each of the non-leaf nodes is connected to two child nodes below it and one parent node above it in the tree structure. In each arbitration cycle of the arbiter, each of the leaf nodes is associated with a contending request. A winner chosen from among the contending requests is determined at the root or uppermost node in the tree. To determine the winner in each arbitration cycle, each non-leaf node executes a contention resolution algorithm to choose a local winner from two requests transmitted to it from the two child nodes below it in the tree. Information identifying the local winning requests is passed up the tree to the nodes in the next higher level so that finally a global winner is determined at the root node.

A round-robin scheduling policy is implemented through use of a token distribution process. In particular, once a winner is determined at the root node, token information is distributed down the tree using a token distribution algorithm executed at each non-leaf node, so that in the next arbitration cycle, the winning leaf node has a lower priority than other leaf nodes in the same priority class. A winning leaf node maintains its lower priority status until all leaf nodes in its priority class have been served, thereby implementing the round-robin scheduling process.

In short, the inventive arbiter may be understood as follows. Leaf nodes of the tree-structured arbiter are connected to requests. Each arbitration cycle comprises a contention resolution phase and a token redistribution phase. In the contention resolution phase, priority information in the form of a local winning request is determined at each non-leaf node in the tree as a result of the execution of a contention resolution algorithm. The priority information flows upward to the root of the tree so that in each arbitration cycle a global winning request is identified at the root of the tree. In the token redistribution phase, token information determined at each non-leaf node using a token distribution algorithm flows down the tree so that the winning leaf node may receive a lower priority than other leaf nodes in the same priority class in the next arbitration cycle to implement a round-robin scheduling policy.

The tree-structured contention resolution scheme used by the centralized arbiter of the present invention has a sublinear time complexity on the order of $\log^N$, i.e., the arbitration time increases with the log of the number N of inputs rather than linearly with N. This represents a significant advantage over prior art variable priority arbiters.

DETAILED DESCRIPTION OF THE INVENTION

Before describing the arbiter of the present invention in detail, it may be helpful to illustrate one application of such an arbiter.

Figure 1:
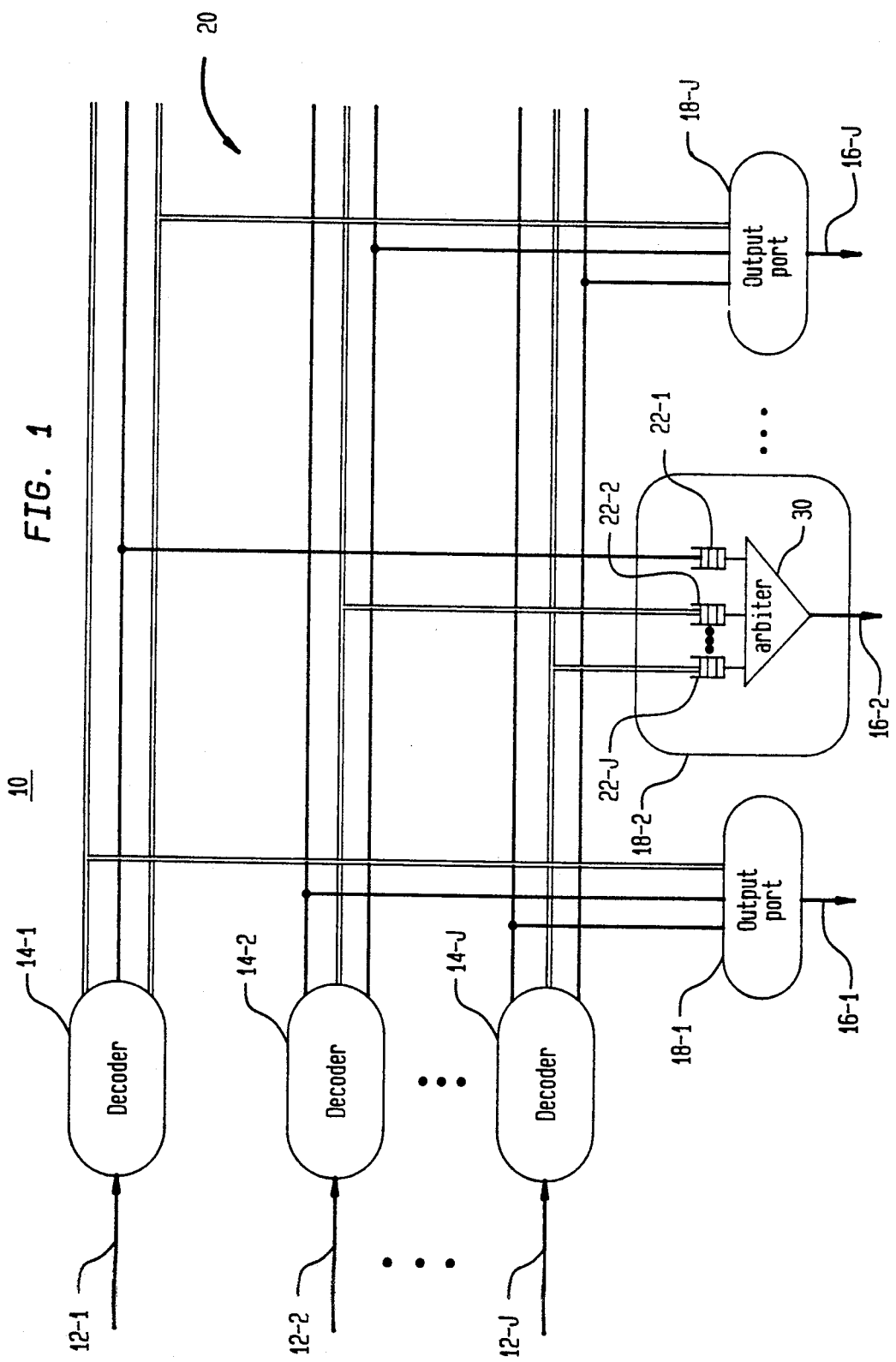
FIG. 1 illustrates an output buffered crosspoint switch which uses an arbiter in accordance with the present invention.

Turning to FIG. 1, a crosspoint switch 10 is illustrated. The crosspoint switch 10 comprises the input buses 12-1, 12-2, . . . ,12-J. Associated with each input bus 12-1, 12-2, . . . ,12-J is a decoder 14-1, 14-2, . . . ,14-J. The switch 10 also includes a plurality of output buses 16-1, 16-2, . . . ,16-5. Associated with each output bus 16-1, 16-2, . . . ,16-J is an output port 18-1, 18-2, . . . ,18J.

Requests for particular output buses 16 arrive via the input buses 12. Each decoder 14 decodes routing information contained in arriving requests to determine to which output ports 18 the arriving requests are to be routed. Depending on whether a request is involved in a point-to-point transmission, a multicast transmission or a broadcast transmission, the request is routed via the crosspoint network 20, to one or all of the output ports 18.

Each output port, e.g., output port 18-2, includes a queue corresponding to each input bus. Thus the output port 18-2 contains the queues 22-1, 22-2, . . . 22-J corresponding to the input busses 12-1, 12-1 . . . 12-J, respectively. Requests arriving via the input buses 12-1, 12-2 . . . 12-J and routed to the output port 18-2 are stored in the corresponding buffers 22-1, 22-2 . . . 22-J. The arbiter 30 controls the access of the requests stored in the buffers 22-1, 22-2 . . . 22-i to the outgoing bus 16-2.

Figure 2A:
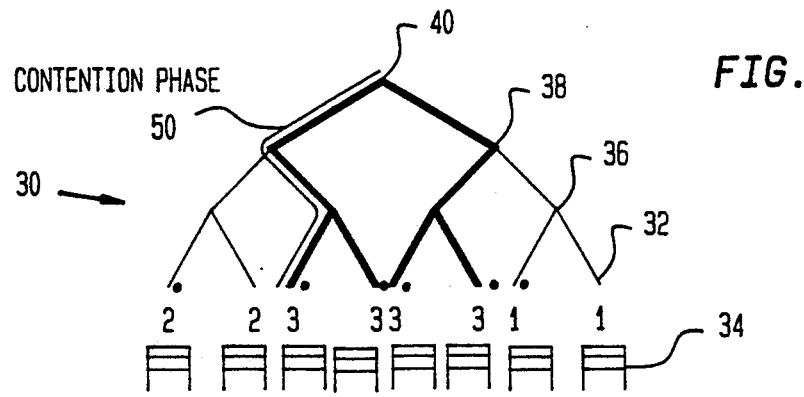
FIGS. 2A and 2B schematically illustrate an arbiter in accordance with an illustrative embodiment of the present invention.
Figure 2B:
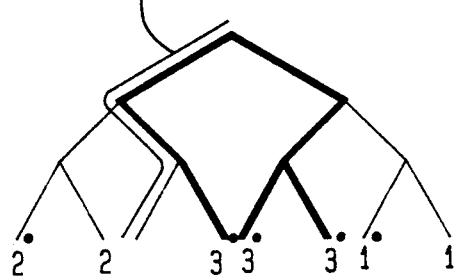

An arbiter 30 in accordance with an illustrative embodiment of the present invention is shown in FIG. 2A and FIG. 2B.

The arbiter 30 of FIG. 2A has a tree structure formed from the leaf nodes 32 and non-leaf nodes, e.g., 6, 38, 40. Each non-leaf node is connected to two child nodes below it in the tree and to one parent node at a higher level in the tree. The uppermost node in the tree is the root node 40. The leaf nodes 32 of the tree arbiter 30 are each associated with a queue or buffer 34 which contains requests. In general, the tree arbiter 30 has N leaf nodes 32 and the requests can belong to P priority classes. In the example of FIG. 2A, P-3 so that the priority classes 1, 2, and 3 are utilized, with class 3 having the highest priority. Each queue 34 has a number associated with it which indicates the priority class of the requests stored therein. The arbiter 30 serves to control the access of the requests stored in the queues 34 to a resource (e.g. a bus or multiplexer) associated with the root node 40 of the tree arbiter 30.

In an arbitration cycle, the arbiter takes N input requests as contenders (i.e. one from each input queue 34) and selects only one winner. The winner is deleted from its queue and a new contender from the winner's queue is considered in the next arbitration cycle.

The tree arbiter 30 utilizes a tree structured contention resolution scheme to achieve an order $\log^N$ latency. This sublinear latency is a significant advantage of the inventive arbiter.

Each arbitration cycle is divided into a contention resolution phase and a token redistribution phase. The contention resolution phase is illustrated in FIG. 2A and the token redistribution phase is illustrated in FIG. 2B. During the contention resolution phase, each non-leaf node of the tree 30 (e.g. nodes 36, 38, 40) executes a contention resolution algorithm so that a single winner is ultimately determined at the root node 40. The token redistribution phase is utilized to implement a round-robin scheduling policy at the leaf nodes. In particular, in an arbitration cycle, after a winner is selected, token bits are redistributed among the leaf nodes to insure that the winning leaf node is not serviced again until the other leaf nodes belonging to the same priority class have been serviced.

Roughly speaking, the contention resolution phase operates as follows. Each non-leaf node serves as a comparator which compares the priorities of two requests received from the two child nodes below it in the tree. Of the two requests received at each non-leaf node, the request of the higher priority wins, and if the two priorities are equal, the request on the left wins. The priority of a request is determined by both its priority class and its token bit.

More particularly, associated with each request is a token bit which may be clear or set. Within a particular priority class, a request with a clear token bit has a lower priority than a request with a set token bit. In FIG. 2A, the set token bits are indicated by "dots" adjacent the corresponding leaf nodes and clear token bits are indicated by the absence of such dots. Note that in FIG. 2A, all requests of the highest priority class (i.e. class 3) have set token bits. Thus, in FIG. 2A, the winning request follows the path 50 to the root node 40 of the tree arbiter 30. During the token redistribution phase, tokens are distributed to the leaf nodes to insure that the winning leaf node (i.e. the third leaf node from the left) has a lower priority than the other leaf nodes of the same priority class until the other leaf nodes of the same priority class are served, thereby implementing a round-robin scheduling policy. As shown in FIG. 2B, the token bits have been redistributed so that the winning leaf node in the contention resolution phase now has a clear token bit and therefore a lower priority than other leaf nodes in the highest priority class.

The arbitration cycle may be understood in more detail as follows. A contention tree is a subtree that connects leaf nodes of equal priority value. A winner's contention tree, identified herein as "Ctree" is a subtree which connects the leaf nodes of the highest priority class (e.g. in FIG. 2A, priority class 3) to the root node of the tree. In FIG. 2A, the Ctree is identified in bold print. A grant trace of an arbitration cycle is a path from the root to the winning leaf node. Thus, in FIG. 2A, the grant trace is the path 50. A "Left Ctree" is the portion of the Ctree including the grant trace and to the left of the grant trace. A "Right Ctree" is the portion of the Ctree to the right of the grant trace.

Figure 3:
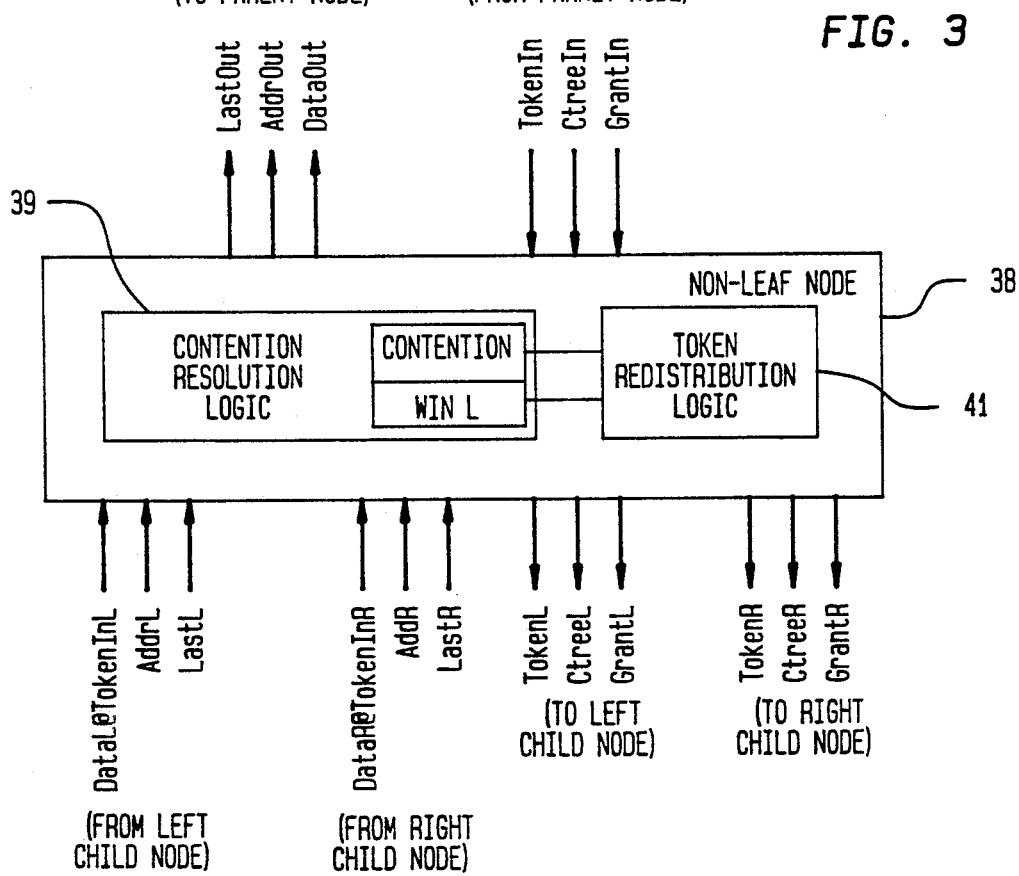
FIG. 3 illustrates a node for use in the arbiter of FIGS. 2A and 2B.

In the contention resolution phase of an arbitration cycle, each non-leaf node records the state of the contention and the position of the winner in "Contention" and "WinL" bits (see FIG. 3). The Contention bit is set if the two input requests to a node have the same priority and WinL is set when the priority level from the left input is greater than or equal to the priority level from the right input.

After the winner is determined (e.g. in FIG. 2A the third leaf from the left), the token redistribution phase begins. In this phase, token bits of the leafs in the Left Ctree will be cleared and the token bits in the Right Ctree will be set to one to carry out the round-robin scheduling policy. In the example of FIG. 2A, the leaf nodes corresponding to the priority 1 and priority 2 requests do not contain the winner and thus are not affected by the token redistribution phase. The redistribution of token bits with clear token bits being distributed to the leaf nodes in the Left Ctree and set token bits being distributed to the leaf nodes in the Right Ctree is shown in FIG. 2B.

Once the token bit of the winning leaf node is cleared, a new request from the queue associated with the winning leaf node can join the next arbitration cycle. However, this new request will have a lower priority then a request from the same priority class at a leaf node that has a set token bit. Therefore in the example of FIG. 2A and FIG. 2B, the request to the right of the previously granted leaf node (i.e. the fourth leaf node from the left) will win the next arbitration cycle.

After the last leaf of the highest priority class (in this case, priority level 3) has been victorious in the contention resolution process of an arbitration cycle, the token bits of the leaves in the left Ctree will all be set to one to restart the next arbitration. Thus, a round-robin scheduling policy is emulated within the Ctree from left to right. The token redistribution logic may be summarized as follows:

If the last leaf node in the Ctree is the winner then set
the token bits at the leaf nodes on the Left Ctree
clear the token bits at the leaf nodes of the Right Ctree else clear the token bits at the leaf nodes in the Left Ctree set the token bits at the leaf nodes in the Right Ctree The algorithms executed by the non-leaf nodes of the tree arbiter are now considered in more detail. FIG. 3 schematically illustrates a non-leaf node 38. The non-leaf node 38 executes a contention resolution algorithm using contention resolution logic 39 during the contention resolution phase of an arbitration cycle and a token redistribution algorithm using token redistribution logic 41 during a token redistribution phase of an arbitration cycle. The contention resolution algorithm sets or clears two bits stored in the non-leaf node 38. These bits are WinL and Contention as schematically illustrated in FIG. 3. The outputs of the contention resolution algorithm which are generated in the node 38 and propagated up the tree to the parent node are Addrout (i.e. the address of the winning request), Dataout (i.e. the priority level and token value of the winning request), and Lastout (i.e. an indication that there is a contender to the right of the current winner). The input signals for the contention resolution algorithm are LastL and LastR (i.e. the Lastout signals from the left and right lower level child nodes connected to the node 38). AddrR and AddrL (i.e the leaf addresses of the requests from the left and right lower level child nodes), TokenInL and TokenInR (i.e. the token values associated with the requests from the left and right child nodes) and DataL and DataR (i.e. the priority classes of the requests from the left and right lower level child nodes).

The following algorithm is executed at the node 38 by the contention resolution logic 39 during the contention resolution phase of an arbitration cycle:

WinL = ge(DataL@TokenInL,DataR@TokenInR)
Contention = equ(DataL,DataR)
LastOut = (-Contention  LastL  WinL)  (LastR  -WinL)
AddrOut = AddrL, if WinL = 1
  or
  AddrR, if WinL = 0
DataOut = DataL@TokenInL, if WinL = 1
  or
  DataR@TokenInR, if WinL = 0

It should be noted that X@Y means that the binary representation of Y is concatenated to the binary representation of X, equ(x,y) means the evaluation is true if x is equal to y, and ge(x,y) means the evaluation is true if x is greater than or equal to y. According to these definitions, priority 1 is the lowest priority class.

As shown in FIG. 3, in the token redistribution phase, the node 38 receives the signals TokenIn, CtreeIn, and GrantIn from its parent node in the tree arbiter. As a result of executing a token redistribution algorithm by the token redistribution logic 41, the node 38 transmits TokenL, CtreeL, and GrantL signals to the left child node and the TokenR, CtreeR and GrantR signals to the right child node. The token distribution algorithm is as follows.

---
TokenL = TokenIn
TokenR = (Contention   GrantIn   WinL) ⊕ TokenIn
CtreeL = CtreeIn   (Contention   WinL)
CtreeR = CtreeIn   (Contention   -WinL)
GrantL = GrantIn   WinL
GrantR = GrantIn   -WinL
---

At the root node, the TokenIn signal is connected to the Lastout signal and both GrantIn and CtreeIn are asserted. As indicated previously, the Lastout signal for each node indicates whether there is a contender to the right of the current winner. If the current winner at the root node originates from the rightmost leaf node in its priority class, Lastout is asserted and the TokenIn signal of the root is also asserted. The token bits in the leaf nodes are set or cleared by gating the TokenIn signal with CtreeIn in a manner such that only the token bits of the leaves of the highest priority class are updated.

From the contention resolution and token distribution algorithms, it is possible to estimate the arbitration latency. An $N=32$ input arbiter requires $\log N=5$ levels of arbitration (i.e. non-leaf) nodes. Since the propagation delay of each arbitration node for P priority levels is on the order of loglogP for a logP bit comparator, the total propagation delay of the N input arbiter with P priority classes is on the order of (loglogP)·(logN).

Although fairness between input queues is achieved through a round-robin scheduling policy on all priority levels, starvation can still occur when high priority requests behind a low priority request in one particular input queue are blocked indefinitely by high priority requests at other input queues. A priority promotion scheme can be used to alleviate this problem. The priority promotion scheme involves raising the priority level of the lower priority requests in front of the blocked high priority requests.

Figure 4:
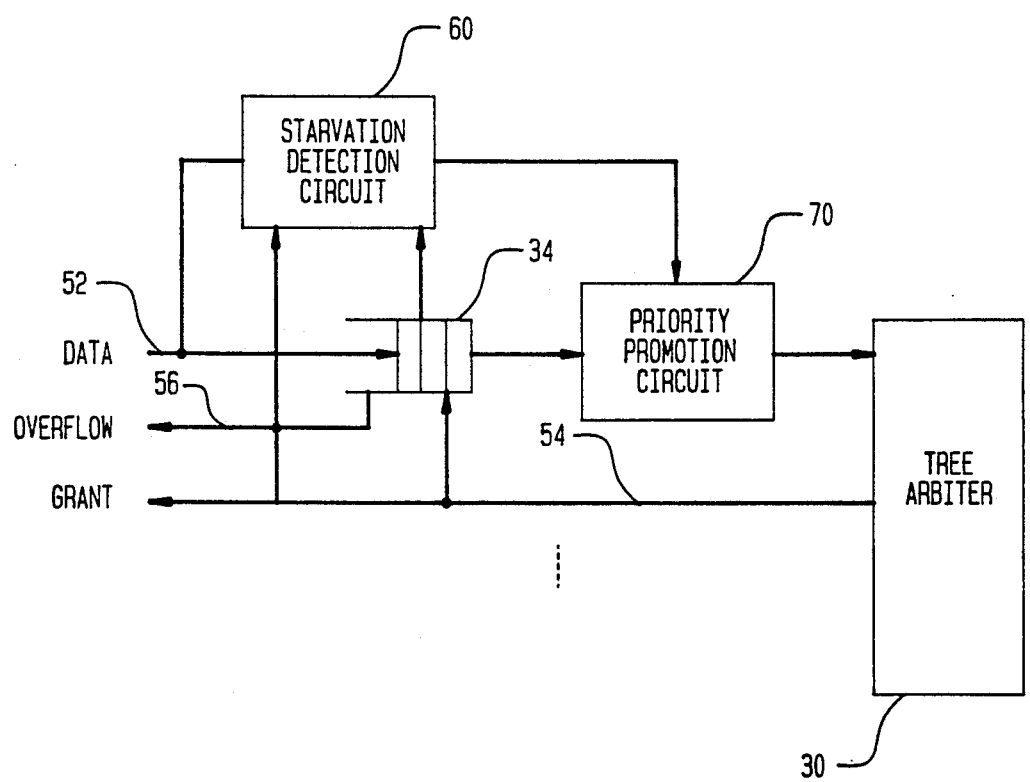
FIG. 4 schematically illustrates a priority promotion circuit for use in the arbiter of FIG. 2A and FIG. 2B.

FIG. 4 schematically illustrates a priority promotion circuit for use with the inventive tree arbiter 30. More particularly, as shown in FIG. 4, there is a priority promotion circuit 70 located between an input queue 34 of the tree arbiter 30 and the corresponding leaf node. Requests arrive at the queue 34 via line 52 and grant signals are transmitted to the queue 34 from the tree arbiter 30 via line 54. An overflow line 56 is also provided for the queue 34. A starvation detection circuit 60 monitors the queue 34 as well as the signals on lines 52 and 54. When conditions require, the starvation detection circuit 60 transmits a priority promotion request to the priority promotion circuit 70. The priority promotion circuit 70 masks the priority level of the request to be inputted to the tree arbiter without actually modifying the priority tags of the requests inside the queue 34.

The inventive tree arbiter has been described in conjunction with a token distribution mechanism to implement a round-robin scheduling policy for the leaf nodes of the highest priority class (i.e. the leaf nodes of the Ctree). In an alternative embodiment, fairness among the leaf nodes of the Ctree may be insured by using a random process to choose a winner when there is contention at the non-leaf nodes. In particular, when there is contention at a non-leaf node, a winner is chosen based on the state of a flipflop at the node rather than based on the state of two input token bits. The flipflops at all the non-leaf nodes in the Ctree are toggled in every arbitration cycle to achieve a random distribution of victories among the leaf nodes. The scheme does not require token distribution and there is no correlation between input position and queuing delay.

A variety of pipelining schemes may be used to improve the performance of the inventive tree-structured arbiter. In a cascading pipeline, the arbitration tree is partitioned into multiple subtrees of smaller size. Round-robin arbitration policies are carried out simultaneously within each subtree and the winners at the low level subtrees become contenders at the next level subtrees. This scheme permits a larger arbitration tree to be formed using pipeline buffers between tree levels but the tradeoff is that a global round-robin sequence is not guaranteed and a high priority request may be blocked behind a low priority request at the top of each subtree.

In an overlapping pipeline, at each clock cycle, a new batch of requests is accepted into the arbitration tree before the arbitration process is completed for the previous batch of requests. Each node records r copies of the WinL and Contention bits so that r overlapped Ctrees, which are separated by one clock cycle, are maintained in the tree arbiter. The overlapping pipeline technique utilizes an r level deep circulating buffer between the arbiter and each input queue. The winning request will be taken out of its circulating buffer and the losers will reenter the circulating buffers with higher priority than new input requests. However, since new requests are input into the arbiters before the winners of previous cycles are deleted, it is possible that later arriving requests will be granted before earlier arriving requests. Therefore, this scheme does not guarantee the sequential servicing of requests for each input.

Finally, the above-described embodiments of the invention are intended to be illustrative only. Numerous alternative embodiments may be devised by those skilled in the art without departing from the spirit and scope of the following claims.

I claim:

1. A method implemented in a tree-structured arbiter circuit for controlling access to a resonance in an electronic network comprising the steps of during an arbitration cycle, receiving at a plurality of leaf nodes of the tree-structured arbiter circuit a plurality of requests, each request having a token bit and being from a plurality of priority classes for said resonance, in a contention resolution phase of said arbitration cycle, determining, at each of a plurality of non-leaf nodes of the tree-structured arbiter circuit, priority information by executing a contention resolution algorithm and transmitting said priority information up the tree-structured arbiter circuit so that a winning request is determined at a root node of the tree-structured arbiter circuit, and in a token redistribution phase of said arbitration cycle, determining, at each non-leaf node, token redistribution information by executing a token redistribution algorithm and transmitting the token redistribution information down the tree-structured arbiter circuit to the leaf nodes so that said leaf node receiving said winning request receives a lower priority than other said leaf nodes having the same priority in a next arbitration cycle to implement a round-robin policy for serving requests at said leaf nodes.

2. The method of claim 1 wherein during said contention resolution phase, each said non-leaf node receives two input requests, each said input request having a priority from two child nodes below it in the tree-structured arbiter circuit, and executed said contention resolution algorithm to determine a local winner.

3. The method of claim 2 wherein said contention resolution algorithm comprises comparing said priorities of said two input requests.

4. The method of claim 3 wherein said priority of each said request is determined by a combination of priority class information and token information is determined during said token redistribution phase of a previous arbitration cycle so that said leaf nodes having requests of a same priority class are served on a round-robin basis.

5. The method of claim 4 wherein at one of said non-leaf nodes, said local winner is the input request with higher priority if said two input requests have unequal priority and if said two input requests have an equal priority, said local winner is determined by an arbitrary rule followed at said plurality of non-leaf nodes.

6. The method of claim 1 wherein said leaf nodes service requests belonging to a plurality of priority classes and wherein said token information received at said leaf nodes during said token redistribution phase of one arbitration cycle determines relative priority of the leaf nodes serving said requests in the highest priority class in the next arbitration cycle.

7. A method implemented in a tree-structured arbiter circuit for controlling access to a resource in an electronic network comprising the steps of serving at a plurality of leaf nodes of the tree-structured arbiter circuit a plurality of access requests, N, of different priority classes in an arbitration cycle, each access request having a token bit, determining at each of a plurality of non-leaf nodes of the tree-structured arbiter circuit priority information by executing a contention resolution algorithm and transmitting the priority information up the tree-structured arbiter circuit so that a winning request from the highest of said priority classes is determined at a root node of the tree-structured arbiter circuit, and determining a relative priority of the leaf node which provided the winning request and the other leaf nodes serving said access requests of the same priority class for a next arbitration cycle so that said plurality of leaf nodes serving said access requests of the highest priority class achieve fair access to said resource, said relative priority determining step including determining at each said non-leaf node token redistribution information by executing a token redistribution algorithm and distributing the token redistribution information down the tree-structured arbiter circuit to the leaf nodes such that the leaf node which provided the winning request receives a lower priority than other leaf nodes having the same priority to implement a round-robin scheduling policy among the leaf nodes serving requests of the highest priority class.

8. The method of claim 7 wherein said resource is a bus in said electronic network.

9. An arbiter circuit for controlling access to a resource in an electronic network comprising a plurality of leaf and non-leaf nodes arranged in a tree structure, each of said non-leaf nodes being connected to two child nodes below it in the tree structure and one parent node above it in the tree structure, said leaf nodes serving a plurality of access requests, of differing priority classes and each request having an associated token bit, each of said non-leaf nodes including means for receiving two of said access requests from the two child nodes connected below it in the tree structure and means for executing a contention resolution algorithm to determine priority between the two received requests so that a winning request is determined at the uppermost node in said tree, said winning request being chosen from the highest of said priority classes, means for executing a token redistribution algorithm for determining token redistribution information to be transmitted to said leaf nodes, and means for implementing said token distribution information to clear said token bit of said winning request such that the leaf node serving said winning request receives a lower priority than other leaf nodes in the same priority class to implement a round-robin scheduling policy among the leaf nodes serving said access requests of the highest priority class.

10. The arbiter circuit of claim 9 wherein each of a plurality of priority raising circuits is associated with an input queue of the arbiter circuit and with one of said leaf nodes to prevent a high priority request at said input queue from being blocked indefinitely behind a low priority request at the associated leaf node.

11. The arbiter circuit of claim 9 wherein each of said non-leaf nodes further comprises means for comparing the priorities of the said access requests from said two child nodes connected below each of said non-leaf nodes in the tree structure and means for selecting a winner from among two said access requests, wherein said access request of the higher priority wins and if the two priorities are equal, the winner is selected based upon a pre-determined convention.

12. The arbiter circuit of claim 9 wherein each said access request has an associated priority class and wherein said resolution executing means comprises means for determining the priority of each said access request based upon its associated priority class and token bit.

13. The arbiter circuit of claim 10 wherein each of said priority raising circuits comprises a priority promotion circuit located between the associated input queue and the associated leaf node and a starvation detection circuit connected to the associated input queue for monitoring the associated input queue and transmitting a priority promotion request to said priority promotion circuit upon detecting the high priority request in the associated queue being blocked behind the low priority request at the associated leaf node, said priority promotion circuit, upon receiving said priority promotion request, masking the priority of the low priority request as having a higher priority without modifying the priority of the low priority request.

* * * * *